April 2, 1963 L. M. VALLESE 3,084,294

STABILIZED OSCILLATOR POWER SOURCE WITH FEEDBACK DIODE CAPACITANCE CONTROLS

Filed Jan. 8, 1959 3 Sheets-Sheet 1

INVENTOR.
LUCIO M. VALLESE

BY

Louis B. Applebaum

ATTORNEY

April 2, 1963 L. M. VALLESE 3,084,294

STABILIZED OSCILLATOR POWER SOURCE WITH FEEDBACK DIODE CAPACITANCE CONTROLS

Filed Jan. 8, 1959

3 Sheets-Sheet 2

INVENTOR.
LUCIO M. VALLESE

BY
Louis B. Applebaum
ATTORNEY

INVENTOR.
LUCIO M. VALLESE
BY
Louis B. Applebaum
ATTORNEY

United States Patent Office 3,084,294
Patented Apr. 2, 1963

3,084,294

STABILIZED OSCILLATOR POWER SOURCE WITH FEEDBACK DIODE CAPACITANCE CONTROLS

Lucio M. Vallese, Brooklyn, N.Y., assignor, by mesne assignments, to United States of America as represented by the Secretary of the Navy Filed Jan. 8, 1959, Ser. No. 785,764
2 Claims. (Cl. 331—109)

This application is a continuation-in-part of application Serial No. 772,145, filed November 5, 1958, now abandoned.

This invention relates to stabilized power sources and especially to a power source in which stabilization is accomplished by a feedback loop extending from the output to the input of the power source.

For many applications of electronic and communication engineering, for example with transistors and with magnetic or dielectric amplifiers, it is important to use a current-stabilized power source. Usually current-stabilized generators are voltage generators which are modified by the series addition of a fixed resistance or of a variable "dynamic" resistance. Although the load may vary, the voltage generator supplies approximately constant power, the difference between the output power and the power required by the load being dissipated by the series resistance.

Similarly, for many applications in the field of measurement, a power-stabilized source—i.e., a source which delivers constant power regardless of load—is of value. Although such sources are not in common use, constant power output can be obtained from a voltage generator if a variable resistance is inserted in series with the load and the value of this resistance is automatically controlled by the load so as to maintain constant power output. In all such cases, the overall efficiency of the unit is approximately constant despite load variations.

Both types of stabilized sources consist essentially of a feedback loop which does not include the actual source, but is inserted between the source and the load. The source delivers practically constant power, higher than the amount required by the load, and the difference between the two is dissipated in the feedback network. As a result, the overall efficiency is rather low.

The objects and advantages of the present invention are accomplished by making the power source an internal component of the feedback loop. The source thus does not deliver constant power but power in an amount proportional to that actually required by the load. Thus, although the same type of source may be used as heretofore, the result is higher efficiency.

An object of this invention is to stabilize the output of a power source.

Another object is to attain higher efficiencies in stabilized power sources.

Other objects and many of the attendant advantages of this invention will be readily appreciated as the same becomes better understood by reference to the following detailed description when considered in connection with the accompanying drawings wherein—

Figure 1:
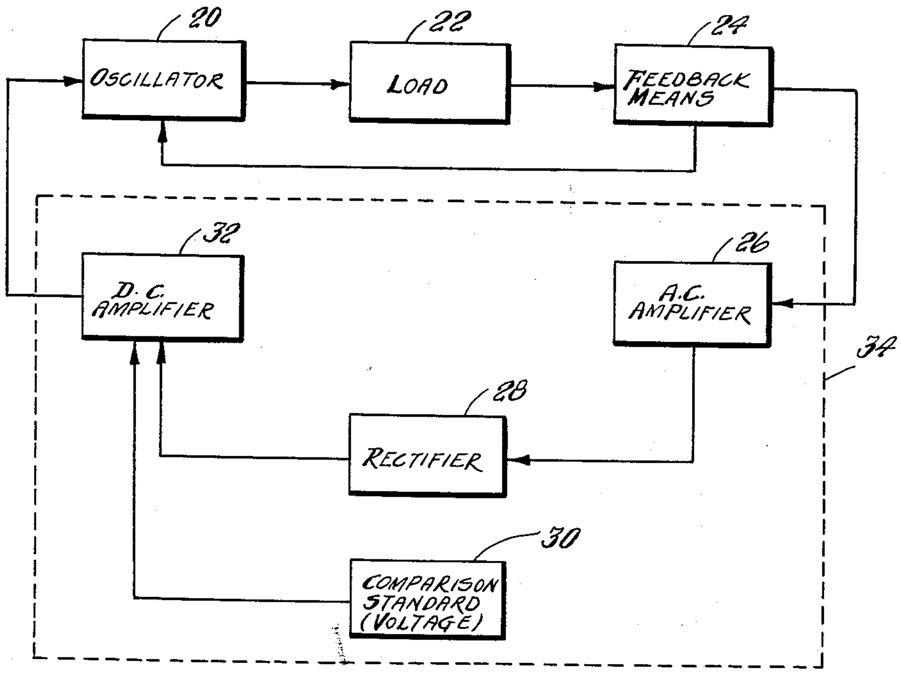
FIG. 1 is a simplified block diagram of the invention.

In FIG. 1, the output of an oscillator 20 which may, for example, be a sinusoidal oscillator is connected in series with a load 22 and a feedback means 24 which may be an impedance or a resistance, for example.

The load current flowing through the feedback means 24 generates a voltage which is amplified by an A.C.

amplifier 26 and rectified by rectifier 28. The rectified output is now compared with a fixed or standard voltage derived from a comparison standard 30, which may be any suitable source of D.C. voltage such as a battery or a regulated D.C. power supply.

The differential D.C. voltage resulting from the comparison is amplified by a D.C. amplifier 32 and fed back to the oscillator 20 to maintain its output current at a constant level.

Figure 2:
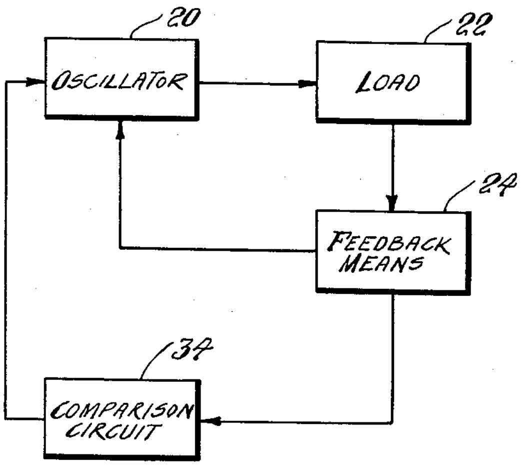
FIG. 2 is a block diagram of the invention.

As shown in FIG. 2, the A.C. amplifier 26, rectifier 28, comparison standard 30 and D.C. amplifier 32 comprise what may be considered a comparison circuit 34. The feedback loop is integral with the power source or oscillator 20 and includes the load 22, the feedback means 24 and the comparison circuit 34. (This feedback loop may be designated the control feedback loop to distinguish it from the regenerative feedback loop which characterizes all oscillators.)

Figure 3:
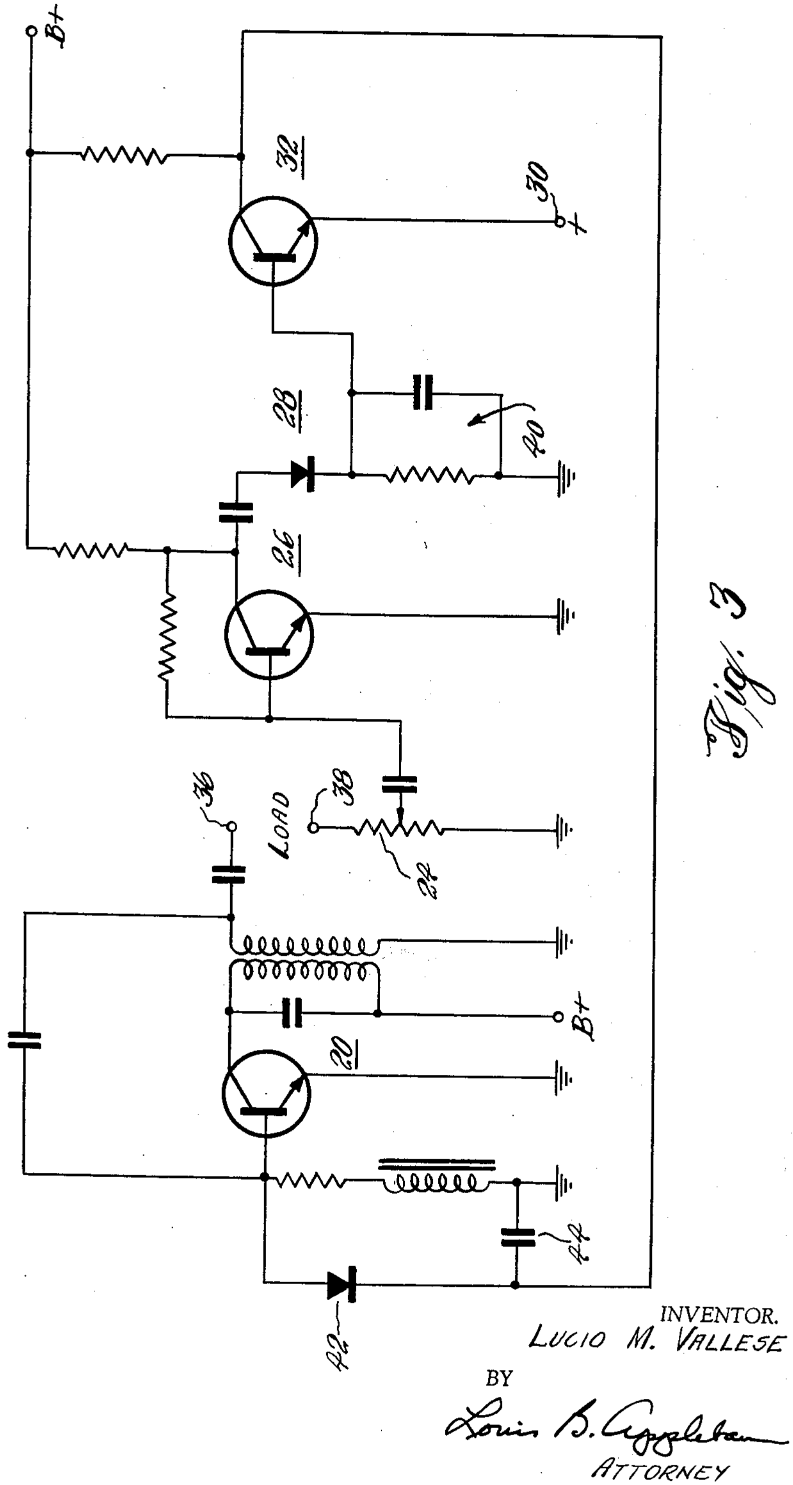
FIG. 3 is a schematic circuit diagram of a current stabilized power source.

FIG. 3 shows a schematic circuit diagram of an embodiment of the invention. The power source or oscillator 20 is a conventional transistor oscillator with transformer-coupled regenerative feedback from collector to base.

The output is taken from the base-coupled side of the collector-base regenerative feedback transformer and fed to one of the load terminals 36, the other load termnial 38 being connected to the feedback means 24 which, in this case, is a potentiometer. As may be seen, the feedback means 24 is in series with the load.

A proportion of the voltage developed across the potentiometer by the load current flowing through it is tapped off by the contact arm of the potentiometer and fed to a conventional transistor A.C. amplifier stage 26. The output of the A.C. amplifier 26 is rectified by a rectifier stage 28 and filtered by resistance-capacitance filter 40. The filtered D.C. voltage is compared with a fixed, or standard, voltage 30, a positive comparison voltage being convenient in this particular circuit. The comparison is made in this case by applying the rectified filter voltage to the input of the D.C. amplifier stage 32 which also functions as a comparator. The output of the D.C. amplifier stage 32 is proportional to the deviation of the filter voltage from the value of the standard voltage 30, that is, the output is proportional to the net base-to-emitter voltage.

The output voltage of the comparator-D.C. amplifier 32 controls the capacitance value of a junction diode 42 which is employed as a variable capacitor by applying reverse biasing to it. This variable capacitor is connected between the base electrode of the oscillator circuit transistor and a blocking condenser 44, or effectively between the input to the transistor and ground. The value of the variable capacitor 42 thus controls the amount of feedback voltage appearing at the input to the oscillator. As a result, if the load changes and the load current is varied thereby, the input voltage to the comparator-D.C. amplifier 32 changes, varying the value of the variable capacitor 42 and changing the amount fed back from the output to the input of the oscillator stage 20 in the correct direction to compensate for the change in load current. For example, if the load decreases in impedance, so that the load current increases, the input voltage to the comparator-D.C. amplifier 32 increases. The net base-to-emitter voltage increases, decreasing the collector voltage of the transistor. This decreases the reverse bias on the junction diode 42, increasing the value of its capacitance which is inversely proportional to the value of reverse bias. The amount of voltage fed back to the base electrode decreases since the capacitive impedance of the diode 42 has decreased and this decreases the output of the oscillator 20 and therefore the load current.

The circuit can be modified into a D.C. current source by series addition of a rectifier between output terminal 36 of the oscillator 20 and the load 22. Or, it may be made a constant power source by substituting a control voltage proportional to the output power for the present control voltage proportional to load current.

Figure 4:
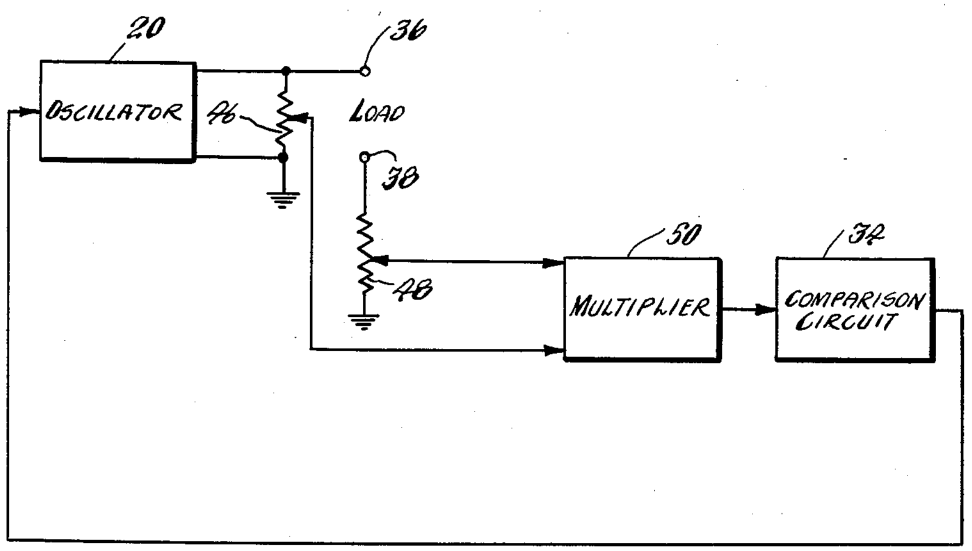
FIG. 4 is a schematic diagram, partially in block form, of a power-stabilized power source.

Thus, FIG. 4 indicates one method in which the oscillator 20 may be converted into a constant power source in accordance with this invention. A potentiometer 46 is connected across the load terminals 36—38 and the potentiometer 48 in series with the load. The output of potentiometer 46 is a voltage proportional to the output voltage of the oscillator 20 and the output of potentiometer 48 is a voltage proportional to the output current of the oscillator 20. It should be noted that in this embodiment the feedback means 24 comprises both potentiometers 46 and 48.

Multiplication of the outputs of the potentiometers 46 and 48 provides a voltage proportional to the output power of the oscillator 20. This multiplication operation can be performed by a conventional multiplier circuit 50, of which many are known in the electronics art.

The output of the multiplier 50 is applied to the comparison circuit 34, which may be that shown in FIG. 3, or which may be any suitable conventional differential amplifier. The resultant D.C. voltage may be applied to a junction diode which controls the oscillator 20 in the same manner as is illustrated in FIG. 3.

Obviously many modifications and variations of the present invention are possible in the light of the above teachings. It is therefore to be understood that within the scope of the appended claims the invention may be practiced otherwise than as specifically described.

I claim:

1. A stabilized power source comprising, in combination: an oscillator providing output power for a load; a potentiometer having a movable contact arm and a resistance element, the latter being connected to said oscillator so that the load current flows therethrough; an A.C. amplifier deriving its input from said movable contact arm of said potentiometer; rectifier-and-filter means connected to said A.C. amplifier for obtaining a D.C. voltage proportional to the output of said D.C. amplifier; connections to a source of power providing a fixed comparison voltage; a D.C. amplifier-comparator, connected to said comparison voltage connections and to said rectifier-and-filter means, for amplifying the difference between the output of said rectifier-and-filter means and said fixed comparison voltage; and variable-capacitance means connected to said D.C. amplifier and said oscillator, said variable-capacitance means comprising a junction diode whose capacitance is variable in accordance with the D.C. voltage applied thereto from said D.C. amplifier, changes in the capacitance of said diode due to changes in applied D.C. voltage resulting from changes in output current of said oscillator causing the strength of oscillation to vary so as to compensate for said change in oscillator output current and return said output current to its original level.

2. A stabilized power source comprising, in combination: an oscillator providing output power for a load; a first potentiometer having a movable contact arm and a resistance element, the latter being connected in series with said oscillator and load so that the load current flows therethrough; a second potentiometer having a movable contact arm and a resistance element, the latter being connected across said load and the resistance element of said first potentiometer; a multiplier circuit connected to receive as inputs the voltages on the contact arms of said potentiometers, the output of said multiplier circuit being proportional to the product of its input voltages and therefore to the output power of said oscillator; a comparison circuit including connections to a source of power providing a fixed comparison voltage, said comparison circuit being connected to receive as an input the output of said multiplier circuit, the output of said comparison circuit being proportional to the difference between the output of said multiplier circuit and the fixed comparison voltage; and variable-capacitance means connected to said comparison circuit and said oscillator, said variable-capacitance means comprising a junction diode whose capacitance is variable in accordance with the magnitude of the output from said comparison circuit, changes in the capacitance of said diode causing the strength of oscillation of said oscillator to vary so as to compensate for the original changes in output power of said oscillator which resulted in said capacitance changes.

References Cited in the file of this patent

UNITED STATES PATENTS

| | | |
|---|---|---|
| 2,143,864 | Conklin et al. | Jan. 17, 1939 |
| 2,473,188 | Albin | June 14, 1949 |
| 2,504,754 | Sweeny | Apr. 18, 1950 |
| 2,820,143 | D'Nelly et al. | Jan. 14, 1958 |
| 2,856,576 | Hook | Oct. 14, 1958 |
| 2,950,446 | Humez et al. | Aug. 23, 1960 |
| 2,959,745 | Grieg | Nov. 8, 1960 |
| 2,968,738 | Pintell | Jan. 17, 1961 |